United States Patent
Gazzano (10) Patent No.: US 10,677,737 B2
(45) Date of Patent: Jun. 9, 2020

(54) ASSEMBLY JOINT INSPECTION SYSTEMS AND METHODS

(71) Applicant: Merit Medical Systems, Inc., South Jordan, UT (US)

(72) Inventor: Frank Gazzano, Mesa, AZ (US)

(73) Assignee: Merit Medical Systems, Inc., South Jordan, UT (US)

( * ) Notice: Subject to any disclaimer, the term of this patent is extended or adjusted under 35 U.S.C. 154(b) by 0 days.

(21) Appl. No.: 16/183,317

(22) Filed: Nov. 7, 2018

(65) Prior Publication Data

US 2019/0145903 A1  May 16, 2019

Related U.S. Application Data (60) Provisional application No. 62/584,283, filed on Nov. 10, 2017.

(51) Int. Cl.
  *G01N 21/88*  (2006.01)
  *G01N 21/952*  (2006.01)

(52) U.S. Cl.
  CPC ..... *G01N 21/8803* (2013.01); *G01N 21/8806* (2013.01); *G01N 21/952* (2013.01)

(58) Field of Classification Search
  CPC ............. G01N 21/8803; G01N 21/952; G01N 21/8806; G01N 21/88; G02B 6/2852; G02B 6/4201; G02B 6/4289; G02B 6/26; G02B 6/44; G01M 11/088
  See application file for complete search history.

(56) References Cited

U.S. PATENT DOCUMENTS

| | | | | |
|---|---|---|---|---|
| 4,791,364 A | * | 12/1988 | Kufis | G01R 31/2868 324/750.08 |
| 5,113,169 A | * | 5/1992 | Ruehl | H01H 85/303 337/265 |
| 5,213,244 A | | 5/1993 | Curtis et al. | |
| 5,489,885 A | * | 2/1996 | Saga | H01H 85/0208 337/198 |
| 5,742,715 A | * | 4/1998 | Boehlke | G01M 11/35 250/227.15 |
| 2006/0176548 A1 | * | 8/2006 | Terada | G01N 21/9501 359/368 |
| 2006/0279312 A1 | * | 12/2006 | Kent | B23K 3/0653 228/260 |
| 2008/0262563 A1 | * | 10/2008 | Sjostedt | A61N 1/3752 607/36 |
| 2009/0297099 A1 | | 12/2009 | Benjamin et al. | |
| 2011/0217004 A1 | | 9/2011 | Niimi et al. | |

(Continued)

FOREIGN PATENT DOCUMENTS

JP  11014724  1/1999

OTHER PUBLICATIONS

International Search Report and Written Opinion dated Feb. 22, 2019 for PCT/US2018/059664.

*Primary Examiner* — Sang H Nguyen
(74) *Attorney, Agent, or Firm* — Stoel Rives LLP (57) ABSTRACT

A test fixture for inspecting joints of fuse assemblies may bend a fuse assembly at a target angle for inspection. The test fixture may include a base and a guide. The base may feature surfaces angled at the target angle. The guide at least partially overhangs the base to form a channel. The guide may include structures to align on the base and inspect the fuse assembly.

11 Claims, 5 Drawing Sheets

(56) References Cited

U.S. PATENT DOCUMENTS

| | | | | |
|---|---|---|---|---|
| 2013/0021603 A1* | 1/2013 | Huang | ............... | G01M 11/088 356/244 |
| 2013/0050692 A1* | 2/2013 | Tang | ............... | B01L 3/50855 356/246 |
| 2013/0063720 A1* | 3/2013 | Flora | ............... | G01N 21/01 356/244 |
| 2014/0268321 A1* | 9/2014 | Damiano, Jr. | ............... | G02B 21/26 359/391 |
| 2015/0030504 A1* | 1/2015 | Pang | ............... | G01N 33/5302 422/82.05 |

* cited by examiner

ASSEMBLY JOINT INSPECTION SYSTEMS AND METHODS

RELATED APPLICATIONS

This application claims priority to U.S. Provisional Application No. 62/584,283, filed on Nov. 10, 2017 and titled, "Assembly Joint Inspection Systems and Methods," which is hereby incorporated by reference in its entirety.

TECHNICAL FIELD

The present disclosure relates generally to the field of medical devices. More particularly, embodiments disclosed herein relate to systems and methods to test and inspect a joint, such as a fuse joint of a catheter assembly.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

This disclosure describes systems and methods to inspect a joints, such as fuse joints on a catheter assembly. The inspection systems described herein includes a test fixture configured to bend the fuse assembly to reveal defects in a joint of the fuse assembly. The test fixture provides consistency between inspections of multiple fuse assemblies by bending each fuse assembly at the same angle.

A "fuse assembly" as used herein is a combination of two or more parts fused together at a joint. Fuse assemblies provide a device, tool, or other instrument the benefit of multiple materials. For example, a catheter may include a shaft made of a material that resists deformation and a tip configured to be malleable to reduce trauma when the catheter enters a patient. Use of the systems and methods discussed herein to inspect other parts or joints is likewise within the scope of this disclosure.

While many benefits may be yielded from fuse assemblies, inspection of fuse assembly joints may reduce the potential for failure of the joint during use (which may in turn complicate medical procedures). For example, a joint of a fuse assembly may break when inserted in a patient. A failure of a joint may be due to impurities introduced to the joint during manufacturing (e.g., foreign particles and embedments), or manufacturing defects (e.g., tool marks, incomplete fusion, cracks, and exposed wire braid). An inspection process of the joint may reveal these and other joint defects and thus provide high quality control.

Some inspection processes may have a technician manually bend and roll the fuse assembly. For example, a technician may inspect a joint of a fuse assembly by supporting the joint over a finger while bending a tip and a body of the fuse assembly. The technician can visually verify the joint is free of separations, cracks or other defects in this bent position. While this method may identify some defects, inconsistencies between inspections may allow defects to go undetected. Inconsistencies between inspections may be introduced by the different sizes of each technicians' finger and the technicians estimating the bend angle of the fuse assembly. This manual process may also damage the fuse assembly. For example, a technician may break a joint by bending the fuse assembly too far.

Embodiments described herein provide systems and methods to consistently and accurately inspect fuse assembly joints. A test fixture may include a curved surface to bend the fuse assembly at a designated target angle. The curved surface ensures that the angle of each inspection is consistent. Additionally, the test fixture may include alignment features to further ensure a consistent fuse assembly inspection. For example, the alignment features may assist a technician in maintaining a joint at a peak of the curved surface of the test fixture.

The phrase "coupled to" is broad enough to refer to any suitable coupling or other form of interaction between two or more entities, including mechanical, fluidic, and thermal interaction. Thus, two components may be coupled to each other even though they are not in direct contact with each other. The phrases "attached to" refers to interaction between two or more entities which are in direct contact with each other and/or are separated from each other only by a fastener of any suitable variety (e.g., mounting hardware or an adhesive).

The terms "proximal" and "distal" are opposite directional terms. For example, the distal end of a device or component is the end of the component that is furthest from the physician during ordinary use. The proximal end refers to the opposite end, or the end nearest the physician during ordinary use.

The components of the embodiments as generally described and illustrated in the figures herein can be arranged and designed in a wide variety of configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

Figure 1A:
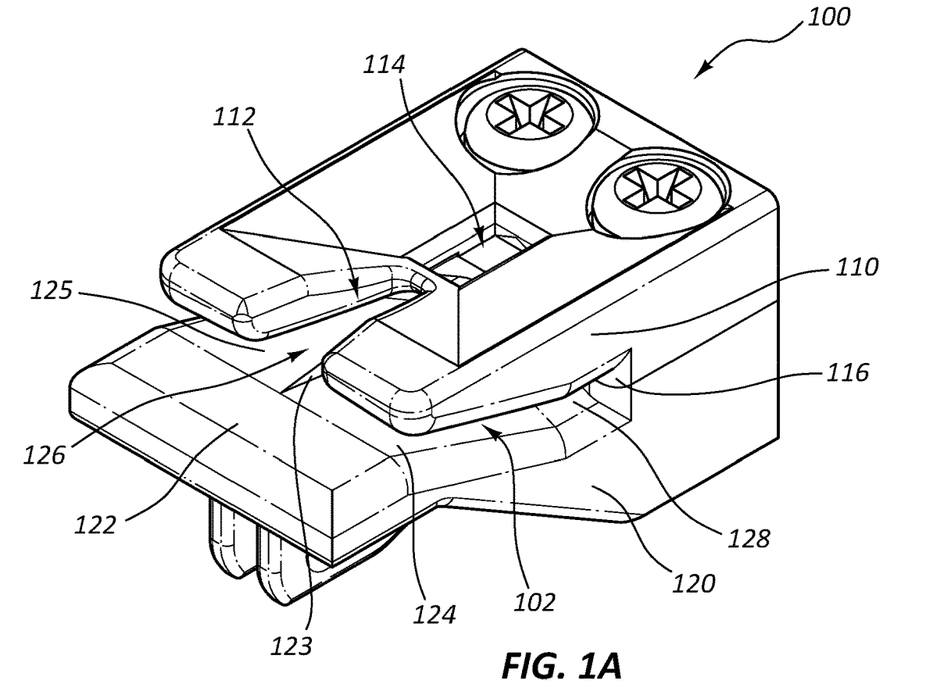
FIG. 1A illustrates a top perspective view of a test fixture, according to one embodiment.

FIG. 1A illustrates a top perspective view of a test fixture 100, according to one embodiment. The test fixture 100 may include a base 120 and a guide 110. The base 120 and the guide 110 may be coupled with a portion of the guide 110 overhanging the base 120 forming a channel 102 with three open sides.

A technician may roll a fuse assembly along the base to achieve a bend at some target angle. The fuse assembly is to be bent for inspection at a specified or target angle. For example, for an inspection, the fuse assembly may be bent to form an acute angle of 135 degrees. Accordingly, the base 120 may feature contact surfaces 124, 125 at an angle relative to one another. The angle between the contact surfaces 124, 125 causes the fuse assembly to bend at the same angle when a first side of the fuse assembly is in contact with a first contact surface 124, and a second side of the fuse assembly is in contact with a second contact surface 125.

The angle between the contact surfaces 124, 125 may be defined by the target angle. In some embodiments, the angle between the contact surfaces 124, 125 may be uniform (e.g., at the desired target angle). In other embodiments, as shown, the angle may change along the length of the base 120 (e.g., the angle becomes steeper along the length of the base 120). The changing angle may gradually bend the fuse assembly to prevent stressing the joint during testing.

In some embodiments, the base may feature three zones to assist in loading, bending and examining the fuse assembly. A loading portion 122 may comprise a flat surface. A technician may place the fuse assembly on the loading portion 122 at the proximal end of the base 120. As the technician roles the fuse assembly forward, the sloped portion 126 gradually bends the fuse assembly. In the sloped portion 126, the contact surfaces 124, 125 become steeper as the fuse assembly travels the length of the base 120, until the target angle is reached. Once the target angle is reached, an inspection zone 128 maintains the target angle at a distal portion of the base 120. The inspection zone 128 provides an area where the angle is known to facilitate consistent defect testing.

A curved surface 123 may couple the two contact surfaces 124, 125. The curved surface 123 may have a radius to bend a joint between a first side and a second side of the fuse assembly at the target angle. In some embodiments, two contact surfaces 124, 125 may be coupled directly together. However, a peak between two contact surfaces 124, 125 coupled directly together may form a sharp angle that could damage a joint of a fuse assembly. The curved surface 123 may prevent damage to the joint. To bend a joint assembly at an angle, the joint may be placed in contact with the curved surface 123, and a first and a second side of the fuse assembly placed in contact with the contact surfaces 124, 125, causing the fuse assembly to be bent at the target angle.

The guide 110 may limit vertical movement of a fuse assembly and provide alignment tools for consistent loading of fuse assemblies into the test fixture 100. The guide 110 couples to the base 120 and comprises a portion that is overhanging a portion of the two contact surfaces 124, 125 of the base 120. The overhanging portion of the guide 110 forms a channel with the base 120. As shown, the channel may have the three open sides. One of the open sides may allow a fuse assembly to be placed into the channel. The other two open sides may allow ends of the fuse assembly to protrude from the channel to allow a technician to manipulate the fuse assembly.

Further, the guide 110 may provide alignment tools for consistent loading of fuse assemblies into the test fixture 100. For instance, the guide 110 may comprise an alignment slot 112, a viewing window 114, and a stopper 116. Each of these components may assist in loading and/or examination of a fuse assembly.

The alignment slot 112 may be in line with the curved surface 123 of the base 120 to facilitate placement of the joint on the curved surface 123. For example, a technician loading a fuse assembly onto the test fixture 100 may view the curved surface 123 through the alignment slot and visually center the fuse assembly joint on the curved surface 123.

The viewing window 114 may provide an opening for visual inspection of a joint. The viewing window 114 may be positioned to provide a view of the curved surface 123 in the inspection zone 128. Thus, the viewing window 114 provides a view of the joint at the target angle of the inspection zone 128.

The stopper 116 may prevent a loaded fuse assembly from moving beyond the viewing window 114. In some embodiments, as shown, the stopper 116 may be a back stop formed from the coupling of the guide 110 and the base 120. In other embodiments, a tab on the base 120 or the guide 110 may retain the position of a fuse assembly for inspection through the viewing window 114. A technician may roll a fuse assembly forward to the viewing window 114, and the stopper 116 may maintain the position of the fuse assembly for inspection.

Figure 1B:
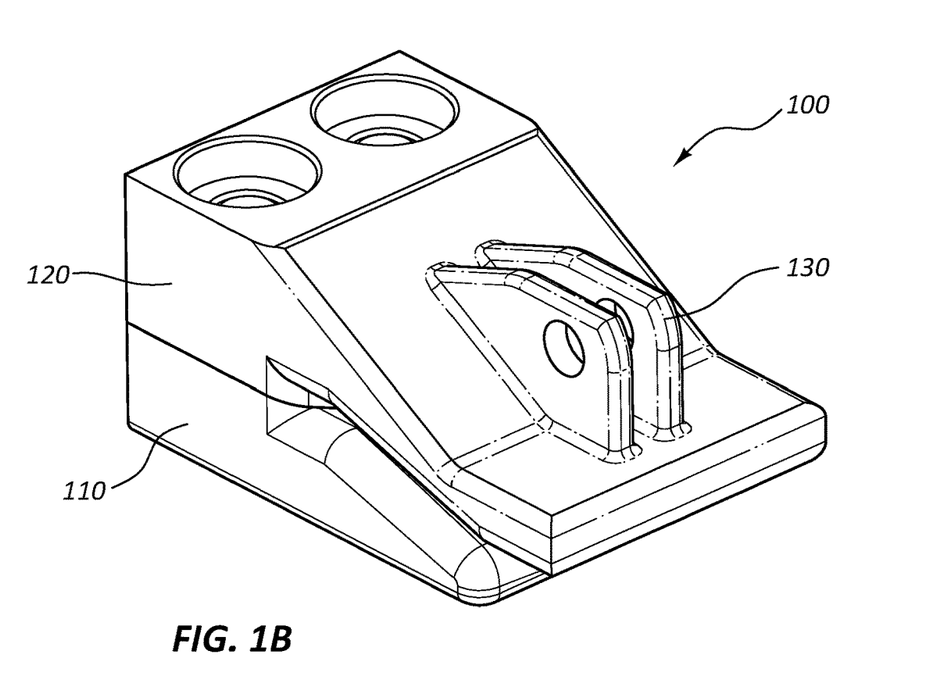
FIG. 1B illustrates a bottom perspective view of the test fixture of FIG. 1A.

FIG. 1B illustrates a bottom perspective view of the test fixture 100 of FIG. 1A. As shown, the base 120 may include a mount 130 or adapter to couple the test fixture 100 to other inspection tools. For example, the test fixture 100 may be coupled to a microscope and the viewing window aligned with the microscope.

Figure 2:
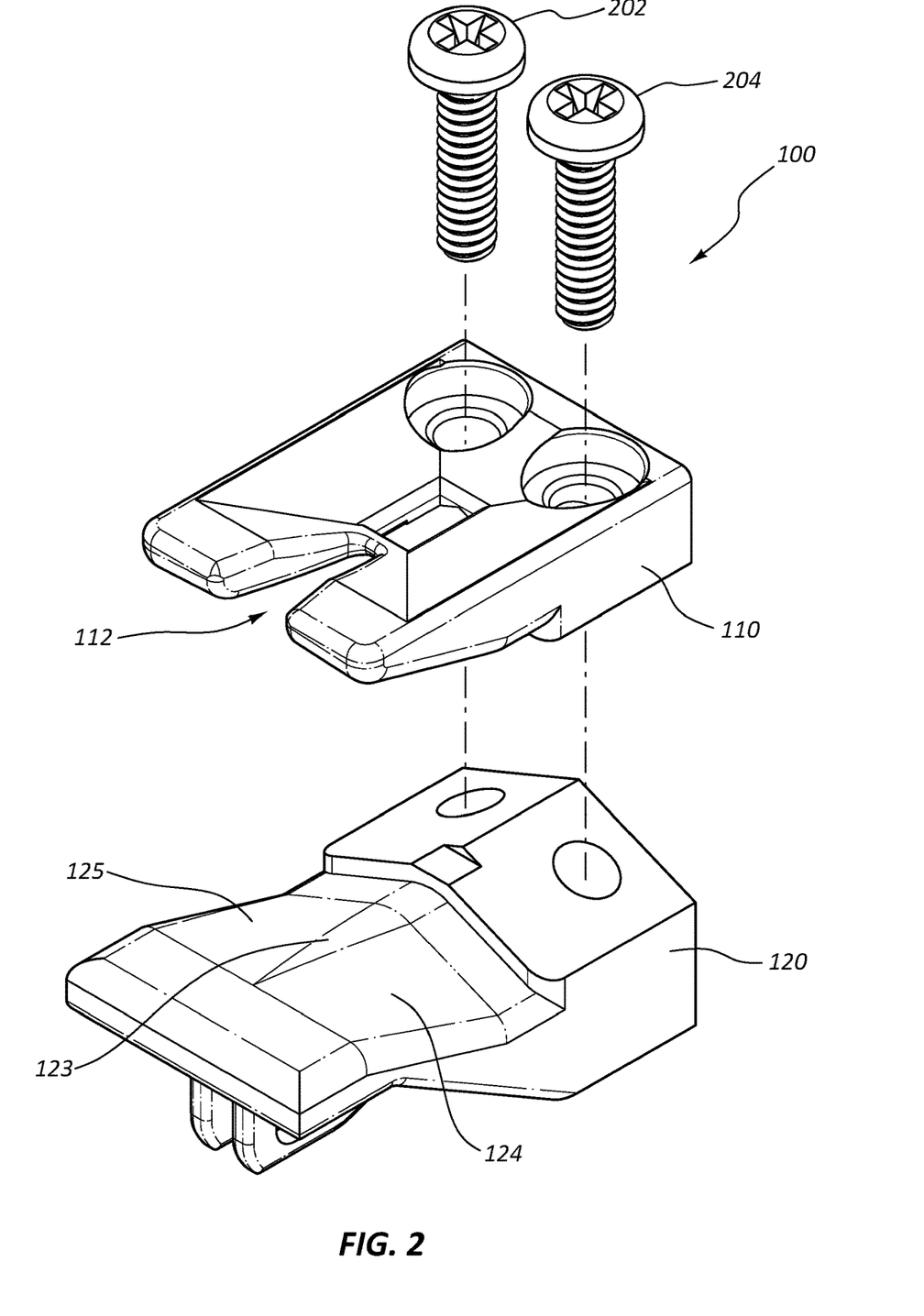
FIG. 2 illustrates a top exploded view of the test fixture of FIG. 1A.

FIG. 2 illustrates a top exploded view of the test fixture of FIG. 1A. As shown, the base 120 and the guide 110 may be coupled together with fasteners 202, 204. The fasteners 202, 204 may be bolts that thread into the base 120. In some embodiments, the base 120 and the guide may be coupled with adhesives, welded together, or a single molded piece.

An angle relative to the two contact surfaces 124, 125 may continuously increase along a length of the base 120 until reaching the target angle. As shown, in some embodiments, to achieve the target angle, the curved surface 123 continuously increases in width along the length of the base until the angle relative to the contact surfaces 124, 125 reaches the target angle. In other words, the contact surfaces 124, 125 may be flat surfaces that are attached to endpoints of a lengthening arch. The lengthening arch has a height and a radius such that tangent lines at end points of the arched contact surface cross at an angle.

Also as shown, the alignment slot 112 may feature a v-shape. The v-shape may narrow as the curved surface 123 widens. The narrowing of the alignment slot 112 can assist a technician in placing the joint of a fuse assembly along a peak of the curved surface 123.

Figure 3:
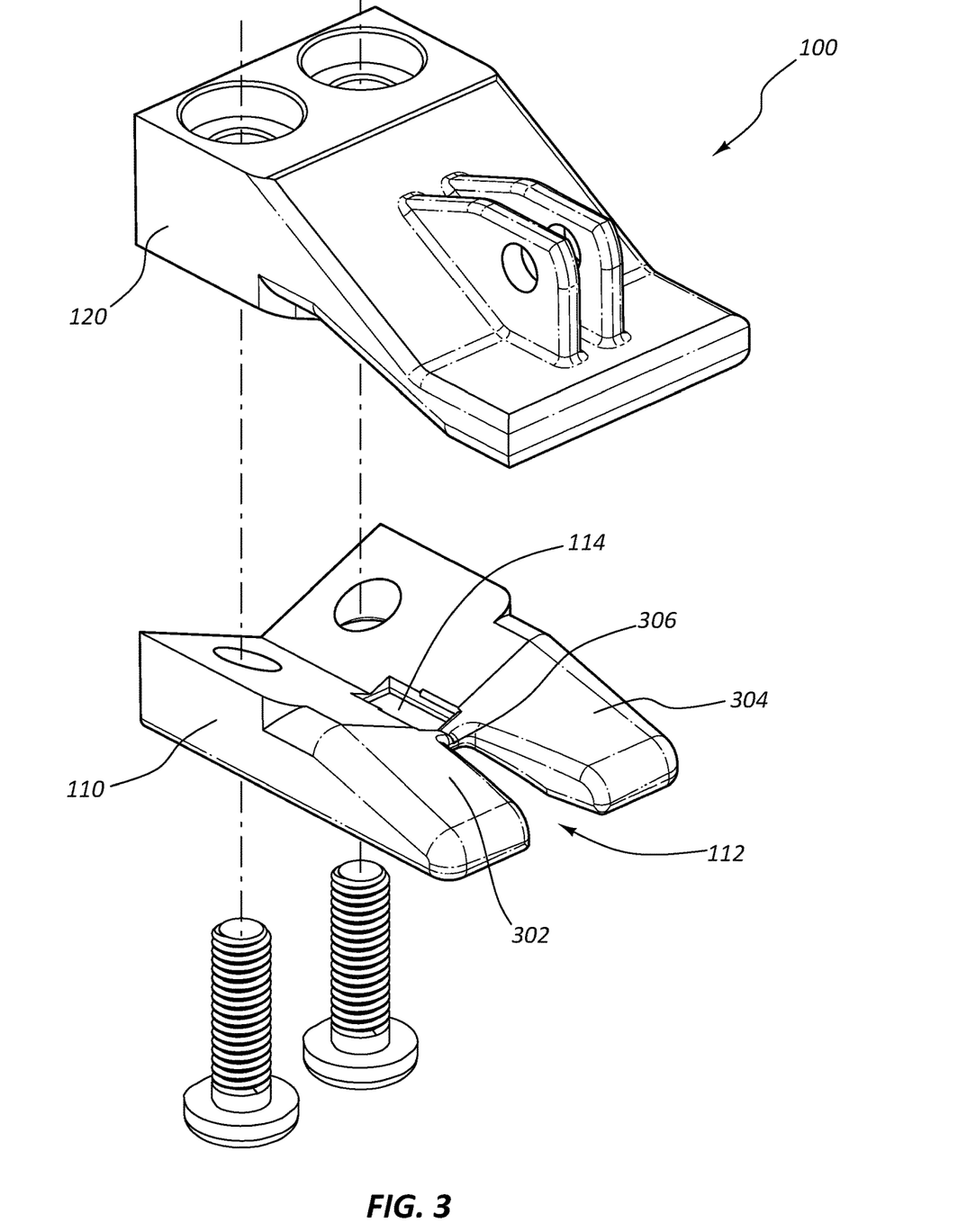
FIG. 3 illustrates a bottom exploded view of the test fixture of FIG. 1A.

FIG. 3 illustrates a bottom exploded view of the test fixture of FIG. 1A. As shown, the guide 110 may feature two upper contact surfaces 302, 304 that overhang a sloped portion of the base 120. The two upper contact surfaces 302, 304 may be parallel with and opposing the two base contact surfaces (124, 125 shown in FIGS. 1A and 2). The two upper contact surfaces 302, 304 may maintain a vertical positioning of a loaded fuse assembly.

The two upper contact surfaces 302, 304 and opposing the two base contact surfaces (124, 125 shown in FIGS. 1A and 2) may be configured to prevent abrasion to a fuse assembly. For example, the surfaces of the test fixture 100 may have a non-stick coating such as polytetrafluoroethylene or Teflon. In the illustrated embodiment, the test fixture features rounded corners to reduce damage to a loaded fuse assembly.

The alignment slot 112 may be v-shaped. In the illustrated embodiment, the tip 306 of the alignment slot 112 is directed towards the viewing window 114. The narrowing of the alignment slot 112 until the viewing window 114 is reached may assist a technician in correctly placing the joint in the viewing window 114. For example, correction to the position of a fuse assembly as it is loaded may be made if the narrowing alignment slot 112 conceals the joint.

The test fixture 100 may be made from various materials. For example, in some embodiments, the test fixture 100 is composed of acrylonitrile butadiene styrene. In other embodiments, test fixture 100 is printed using a thermoplastic material. In yet other embodiments, the test fixture 100 is machined out of steel. In some embodiments, a combination of these manufacture technics and/or materials may be used.

Figure 4:
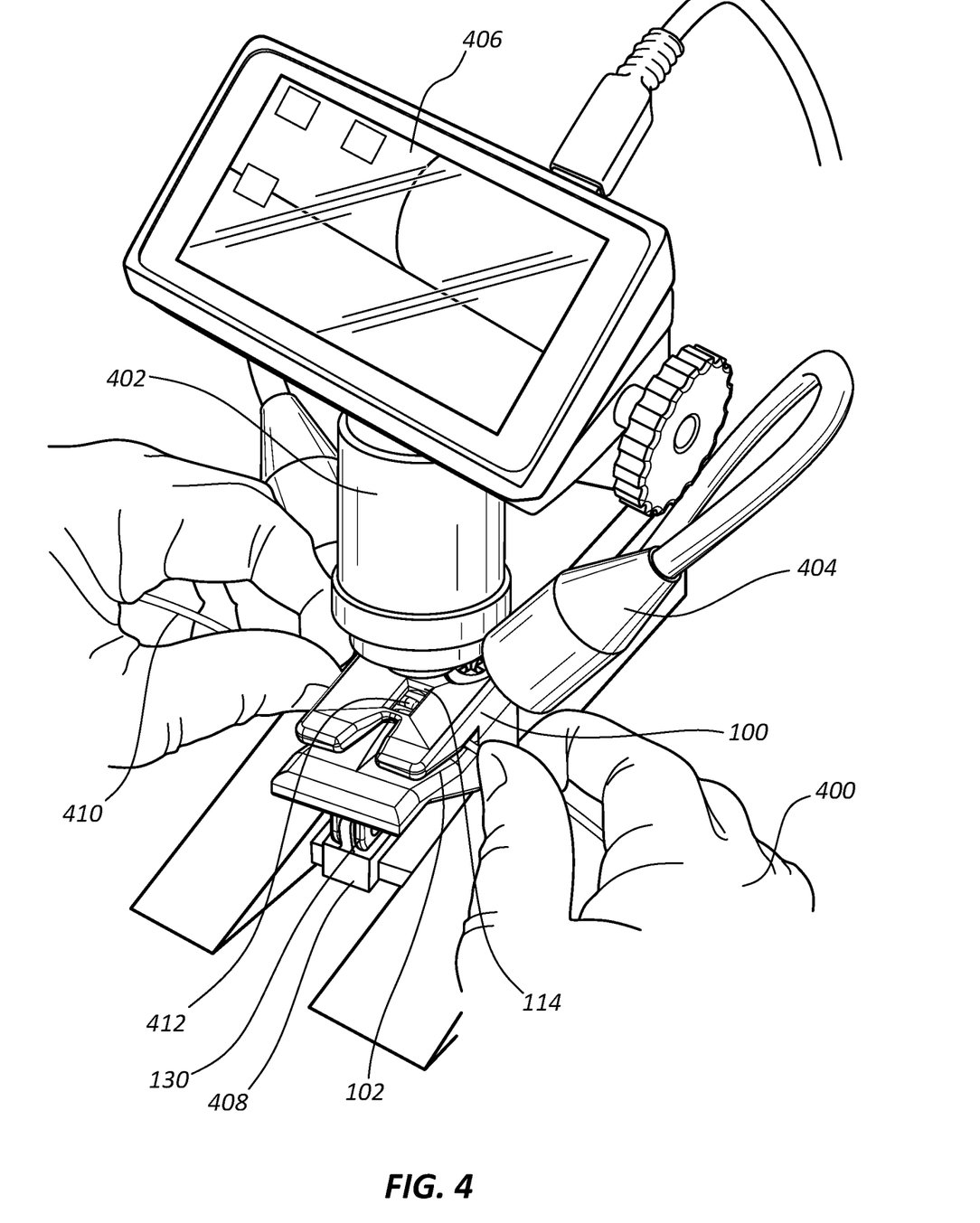
FIG. 4 illustrates a perspective view of the test fixture of FIG. 1A coupled to a microscope.

FIG. 4 illustrates a perspective view of the test fixture 100 of FIG. 1A coupled to a microscope 402. The test fixture 100 may couple to the microscope via the mount 130. The mount 130 or the corresponding support structure 408 of the microscope may be adjustable. For instance, the support structure 408 may be moved vertically and/or laterally.

A technician 400 may adjust the position of the test fixture 100 so that the microscope 402 is centered on the viewing window 114. One or more lighting elements 404 may be directed toward the viewing window 114 to remove shadows from a joint 412 of a fuse assembly 410 being inspected. In some embodiments, the microscope includes an electronic display 406 that displays a magnified image of the joint 412. The technician 400 may focus the microscope 402 on a peak of the curved surface of the test fixture 100 in the viewing window 114.

The technician may roll the fuse assembly 410 into the channel 102 of the test fixture 100. As shown, the channel 102 includes open sides to allow sides of the fuse assembly 410 to protrude from the test fixture 100. The technician 400 can manipulate the position of the fuse assembly by rolling the sides of the fuse assembly 410.

In some embodiments, the viewing window 114 is large enough to facilitate a view of a full rotation of the fuse assembly 410. This may allow the technician 400 to inspect all sides of a joint. For example, the technician 400 may begin inspection at a distal end of the viewing window 114 and continue inspection as the technician 400 rolls the fuse assembly 410 to a proximal end of the viewing window 114. The displacement from the distal end to the proximal end of the viewing window 114 may be sufficient that the fuse assembly 410 must completely roll over at least once.

Figure 5:
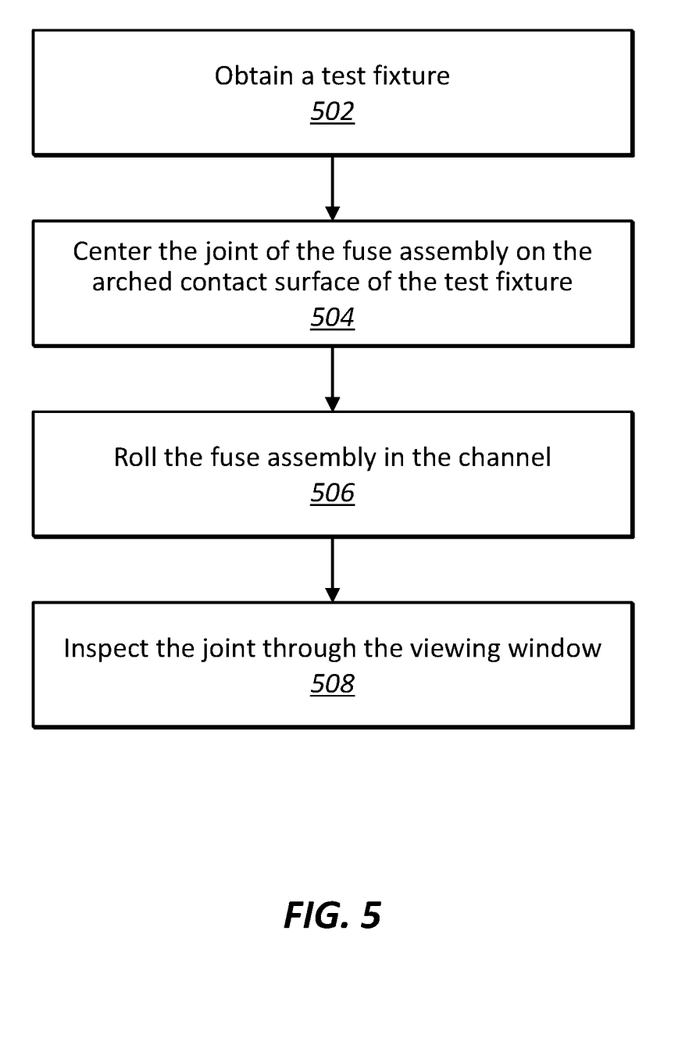
FIG. 5 illustrates a flow diagram of a method for inspecting a joint on a fuse assembly.

FIG. 5 illustrates a flow diagram 500 of a method for inspecting a joint on a fuse assembly. The method may be used to find imperfections in the joint that may lead to joint failure. For example, a technician may use this method to find foreign particles, embedments, tool marks, incomplete fusion, cracks, and/or exposed wire braid in the joint.

A technician may obtain 502 a test fixture with a base and a guide. As discussed in more detail with reference to the previous figures, the base may include an arched contact surface with a height and a radius such that tangent lines at end points of the arched contact surface cross at a target angle. The guide coupled to the base may include a first portion that is overhanging the arched contact surface forming a channel with the three open sides. The overhanging portion of the guide may include a slot aligned with the curved surface of the base, and a viewing window bordering the brace and aligned with the curved surface.

To load a fuse assembly, a technician may center 504 the joint of the fuse assembly on the arched contact surface of the test fixture. The centering 504 may be performed on a loading portion of the base where the guide does not overhang. A center marker may indicate the peak of the arched contact surface. In some embodiments, the arched contact surface may narrow to a point at or near the loading portion of the base, and the point represents the peak of the arched contact surface.

The technician can roll 506 the fuse assembly in the channel along the base of the test fixture. A first side of the fuse assembly may be in contact with a first end point of the arched contact surface, a second side of the fuse assembly may be in contact with a second end point of the arched contact surface, and the joint may be in contact with the arched contact surface. The positions of the contact surfaces may cause the fuse assembly to be bent at the target angle.

As the technician rolls 506 the fuse assembly in the channel, the technician may monitor the joint in the slot to ensure the joint remains in contact with the arched contact surface as the fuse assembly is rolled along the base. The rolling can be performed in one direction with both sides of the fuse assembly rotated at the same speed to ensure that there is no twisting motion or axial stress between the two sides of the fuse assembly. Additionally, when rolling, the technician should not apply a pulling force to the fuse assembly.

The technician may inspect 508 the joint through the viewing window. The inspection may be done via a microscope focused on a peak of arched contact surface. The inspection may be performed when the fuse assembly reaches a stopper on the test fixture or the back of the test fixture. During the inspection, the technician may look for flaws in the joint such as particles, embedments, tool marks, incomplete fusion, cracks, and exposed wire braid.

To remove the fuse assembly, the technician may roll the fuse assembly out of the channel. This may prevent stressing the joint when compared with other methods of removal such as pulling. The roll to remove the fuse assembly may be the opposite direction as the roll to load the fuse assembly. In some embodiments, the direction of rolling remains the same for loading and removing the fused assembly; however, the rolling is along the base of the test fixture to load the fuse assembly and along the guide of the test fixture to remove the fuse assembly.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

I claim:

1. A test fixture for inspecting a fuse joint, the test fixture comprising:
    a base to roll a fuse assembly along comprising:
        two base contact surfaces at an angle relative to one another, and
        a curved surface coupling the two contact surfaces, the curved surface having a radius to bend a joint between a first side and a second side of the fuse assembly at a target angle; and
    a guide covering at least a portion of the two contact surfaces of the base, the guide comprising:
        a guide contact surface parallel with and opposing the two base contact surfaces to maintain a vertical positioning of the fuse assembly,
        a support to couple a first portion of the guide to the base and holding the guide contact surface at a distance from the two base contact surfaces such that a channel is formed between the base and a second portion with three open sides;
        a slot aligned with the curved surface of the base to facilitate placement of the joint on the curved surface,
        a stopper to maintain the position of the fuse assembly for inspection, and
        a viewing window aligned with the curved surface at the stopper.

2. The test fixture of claim 1, wherein the angle relative to the two base contact surfaces continuously increases along a length of the base until reaching the target angle.

3. The test fixture of claim 2, wherein the curved surface continuously increases in width along the length of the base until the angle relative to the two base contact surfaces reaches the target angle.

4. The test fixture of claim 2, wherein the base further comprises an inspection portion where the angle remains constant.

5. The test fixture of claim 1, wherein the slot is v-shaped with a tip of the slot directed towards the viewing window.

6. The test fixture of claim 1, further comprising an adapter to couple the base to a microscope.

7. The test fixture of claim 6, further comprising a microscope and lighting elements, wherein the lighting elements are directed towards the viewing window, and the adaptor is configured to focus the microscope on a peak of the curved surface visible in the viewing window.

8. The test fixture of claim 1, wherein the viewing window is large enough to facilitate a view of a full rotation of the fuse assembly rolled along the base.

9. The test fixture of claim 1, wherein the base and the guide are composed of acrylonitrile butadiene styrene.

10. The test fixture of claim 1, wherein the base and the guide are printed using a thermoplastic material.

11. The test fixture of claim 1, wherein the base and the guide are machined out of steel.

* * * * *